United States Patent [19]

Jong

[11] 4,184,884
[45] Jan. 22, 1980

[54] PROCESS FOR PRODUCING A METASTABLE PRECURSOR POWDER AND FOR PRODUCING SIALON FROM THIS POWDER

[75] Inventor: Bing W. Jong, Northport, Ala.

[73] Assignee: The United States of America as represented by the Secretary of the Interior, Washington, D.C.

[21] Appl. No.: 953,393

[22] Filed: Oct. 23, 1978

[51] Int. Cl.$^2$ .................... C04B 35/50; C04B 35/58
[52] U.S. Cl. ............................ 106/73.2; 106/65; 106/73.4; 264/56; 264/65
[58] Field of Search ............... 423/327; 106/65, 73.2, 106/73.4; 264/56, 65, 66

[56] References Cited

U.S. PATENT DOCUMENTS

| | | | |
|---|---|---|---|
| 3,991,166 | 11/1976 | Jack et al. | 423/327 |
| 4,072,532 | 2/1978 | Fletcher et al. | 106/65 |
| 4,113,503 | 9/1978 | Lumby et al. | 106/73.4 |
| 4,127,416 | 11/1978 | Lumby et al. | 106/73.2 |

OTHER PUBLICATIONS

Masaki et al., Japan, J. Appl. Phys., vol. 14, (1975), No. 2, pp. 301 & 302.
Oyama, Japan, J. Appl. Phys., vol. 11, (1972), pp. 760 & 761.

*Primary Examiner*—Edward J. Meros
*Attorney, Agent, or Firm*—William S. Brown; Donald A. Gardiner

[57] ABSTRACT

There is disclosed a process for producing a metastable precursor powder having about 20 to 60 percent of the silicon thereof in the nitride form. This process includes a controlled nitriding step using silicon, alumina, and either aluminum or aluminum nitride as starting materials. There is also disclosed a process for producing sialon from this precursor powder. This process includes the steps of doping the precursor powder, cold pressing or slip casting the doped powder, and then carrying out a controlled sintering step under a nitrogen atmosphere.

13 Claims, 4 Drawing Figures

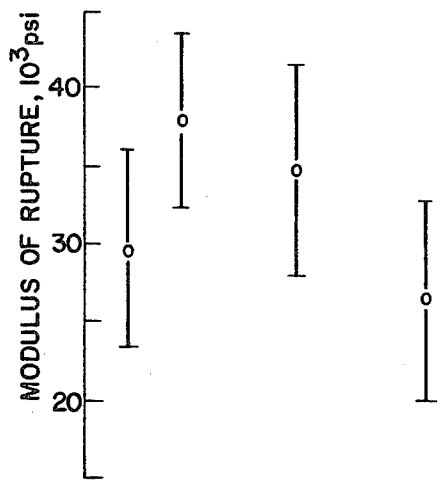
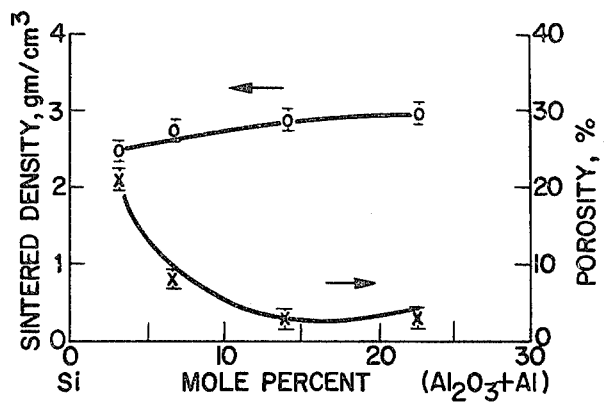
Fig.1A
Fig.1B
Effect of alumina plus aluminum on ambient modulus of rupture, sintered density and porosity of sintered sialons.
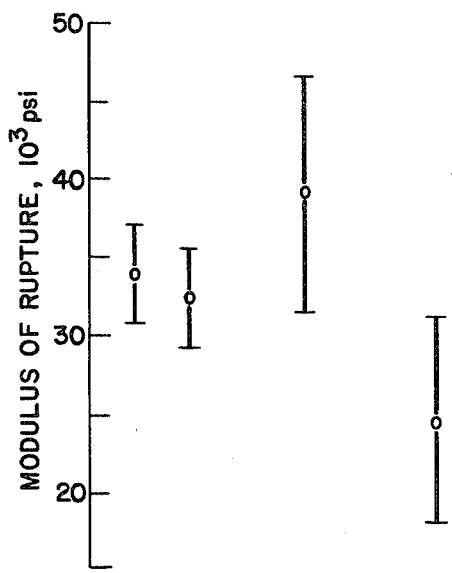
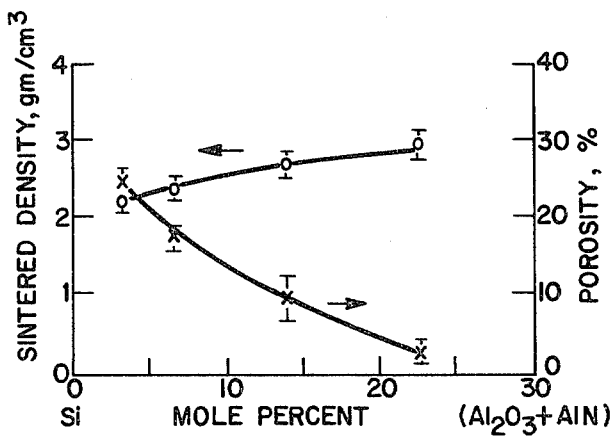
Fig.2A
Fig.2B
Effect of alumina plus aluminum nitride on ambient modulus of rupture, sintered density and porosity of sintered sialons.

PROCESS FOR PRODUCING A METASTABLE PRECURSOR POWDER AND FOR PRODUCING SIALON FROM THIS POWDER

TECHNICAL FIELD

This invention relates to a process of producing a precursor powder using silicon, alumina, and either aluminum or aluminum nitride as starting materials, and relates to the production of sialon from this precursor powder.

BACKGROUND ART

Sialon, the ultimate product of the process of the present invention, is useful in making valve components in coal gasifiers and in the manufacture of gas turbine engine components and metal die cast molds. Furthermore, sialons having good thermal shock and thermal creep, high strength and good oxidation resistance are candidate materials for high temperature applications.

It is well known in the prior art to make sialon, which is also known as silicon aluminum oxynitride, from a mixture of silicon nitride and alumina and also from a mixture of silicon nitride, alumina and alumina nitride. Illustrative of a prior art process utilizing silicon nitride, alumina and aluminum nitride as starting materials in U.S. Pat. No. 4,066,468 to Kamigaito et al. One of the difficulties with this type of approach to the manufacture of sialon is that silicon nitride is expensive. Thus, there has existed in the art a need for a less expensive starting material. Exemplary of a prior art process which does not use a metal nitride as a starting material is U.S. Pat. No. 3,991,166 to Jack et al., which discloses the use of silicon and alumina as starting materials, and which uses boron nitride to protect against surface degradation of the sialon (column 9, lines 59-64). Another prior art patent of interest in this area is U.S. Pat. No. 3,572,992 to Komeya et al., which is directed to manufacturing a molded and sintered mass of aluminum nitride. None of the prior art of which I am aware discloses a process using silicon, alumina and either aluminum or aluminum nitride as starting materials in a controlled nitriding step to produce a metastable precursor powder having about 20 to 60 percent of the silicon thereof in the nitride form and for converting this precursor powder to sialon using a controlled sintering process.

DISCLOSURE OF THE INVENTION

It is accordingly one object of the present invention to provide a process for producing sialon from a lower cost starting material than silicon nitride.

A further object of the present invention is to provide a controlled nitridation step whereby only about 20 to 60 percent of the silicon in the starting material mixture is converted to the nitride form.

A still further object of the present invention is to provide a process for producing sialon from this precursor powder using a controlled sintering step under a nitrogen atmosphere.

Other objects and advantages of the present invention will become apparent as the description thereof proceeds.

In satisfaction of the foregoing objects and advantages, there is provided by this invention a process for producing a metastable precursor powder having about 20 to 60 percent of the silicon thereof in the nitride form. This process includes selecting as starting materials a mixture comprising silicon, alumina and either aluminum or aluminum nitride, and nitriding this mixture at a temperature and for a time sufficient to convert about 20 to 60 percent of the silicon to the nitride form; provided that when the starting materials include alumium, rather than aluminum nitride, this process includes the prior step of pre-reacting the aluminum-containing mixture under a nitrogen atmosphere at a temperature in the range of about 450°-550° C. and for a time of about 30-90 minutes. There is also provided by this invention a process for producing sialon from this precursor powder. This process includes doping the precursor powder with an additive present in an amount sufficient to promote sintering, cold pressing or slip casting the doped powder, and sintering the cold pressed or slip cast powder under a nitrogen atmosphere at a temperature and for a time sufficient to produce a substantially single phase of sialon. In the sintering step, the nitrogen atmosphere is at a presssure sufficient to prevent sialon decomposition.

BRIEF DESCRIPTION OF DRAWINGS

Reference is hereby made to the accompanying drawings which form a part of the specification of the present invention.

FIGS. 1A and 1B set forth test data for the sialons of Examples IX-XII.

FIGS. 2A and 2B set forth test data for the sialons of Examples XIII-XVI.

BEST MODE FOR CARRYING OUT THE INVENTION

As indicated above, the present invention is concerned with a process for the production of a metastable precursor powder having about 20 to 60 percent of the silicon thereof in the nitride form, and further is concerned with a process for the production of sialon from this precursor powder. According to the present invention, the metastable precursor powder is produced by a process which includes the nitridation of a mixture comprising silicon, alumina and either aluminum or aluminum nitride under controlled conditions. Also according to the present invention, sialon is produced from this precursor powder by a process which includes the addition of a dopant to the precursor powder in order to promote sintering, cold pressing or slip casting the doped powder, and then sintering the cold pressed or slip cast powder under a nitrogen atmosphere using controlled conditions to produce a substantially single phase of sialon.

The present invention is based upon the discovery that silicon, alumina, and either aluminum or aluminum nitride can be used as starting materials in a process using a controlled nitridation step for preparing a metastable precursor powder having about 20 to 60 percent of the silicon in the nitride form, and that this metastable powder can be used to produce sialon in a process using a controlled sintering step.

The silicon, alumina, aluminum and aluminum nitride starting materials for the present process are well known chemical compounds. Exemplary sources of these compounds are Kawecki Berylco Industries, Inc. for the silicon, Fisher Scientific for the alumina, and Atlantic Equipment Engineers for the aluminum and the aluminum nitride.

In the first essential step of the process for producing the metastable precursor powder, a mixture comprising silicon, alumina, and either aluminum or aluminum nitride as starting materials is formulated. The following equations are used in selecting the amount of each starting material to be used in the formulation:

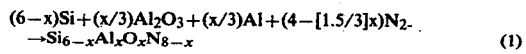

(1)

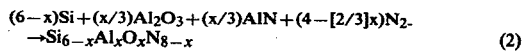

(2)

Equation (1) is to be used when aluminum is used as a starting material, and equation (2) is to be used when aluminum nitride is used as a starting material.

In these equations, X can vary from greater than 0 to 4.2. A very suitable value for X is in the range of about 0.28 to about 1.82, and in this instance the starting materials comprise an amount of silicon in the range of from about 97.0 to about 77.4 mole percent, an amount of alumina in the range of from about 1.5 mole percent to about 11.3 mole percent, and an amount of either aluminum or aluminum nitride in the range of from about 1.5 mole percent to about 11.3 mole percent. A preferred value for X is about 1.17, and in this case the starting materials comprise about 86.0 mole percent silicon, about 7.0 mole percent alumina and about 7.0 mole percent of either aluminum or aluminum nitride.

When the starting materials include aluminum, rather than aluminum nitride, the aluminum-containing mixture is subjected to a pre-reaction step in which the mixture is heated to a moderately high temperature under a nitrogen atmosphere of from suitably about 1 to 5 psi, with about 3 psi being preferred. This step is suitably performed at a temperature ranging from about 450°–550° C. and for a time of about 30–90 minutes. Preferably, a temperature of about 500° C. is selected, and when this temperature is selected, a preferred time is about one hour.

As the next essential step in this process, the starting material mixture or the pre-reacted mixture is subjected to a controlled nitridation step in which the mixture is heated to a high temperature under a nitrogen atmosphere of from suitably about 1 to 5 psi, with about 3 psi being preferred. In carrying out this step, there is selected a temperature and a time sufficient to convert about 20 to 60 percent of the silicon to the nitride form. In the nitridation step, a temperature in the range of about 1300° to 1400° C. and a time of about 2–6 hours are suitable, with about 4 hours being a preferred time.

Prior to either the pre-reacting step or the nitriding step, the starting materials are thoroughly dry mixed; the mixes are screened through 50 mesh; the screened mixes are agglomerated to about minus 20 mesh, using water when the mix contains aluminum, or using acetone when the mix contains aluminum nitride; and then the agglomerated powders are dried.

Reference is now made to following Table I, as disclosing weight percent nitridation as a function of the nitriding temperature. These results are after 4 hours of nitriding. The particular Examples taught in this Table are described in greater detail below.

TABLE I

| Example Number | Starting Materials | X of $Si_{6-x}Al_xO_xN_{8-x}$ | Nitriding Temperature, °C. | Wt-pct Nitridation |
|---|---|---|---|---|
| I | Si + Al$_2$O$_3$ + Al | 1.82 | 1300 | 20 |
| II | Si + Al$_2$O$_3$ + Al | 1.82 | 1380 | 40 |
| III | Si + Al$_2$O$_3$ + Al | 1.82 | 1400 | 50 |
| IV | Si + Al$_2$O$_3$ + AlN | 1.82 | 1300 | 30 |
| V | Si + Al$_2$O$_3$ + AlN | 1.82 | 1380 | 54 |
| VI | Si + Al$_2$O$_3$ + AlN | 1.82 | 1400 | 60 |

As a result of the above-described process, there is produced a metastable precursor powder having about 20 to 60 percent of the silicon in the nitride form. In Examples I through VI, which are set forth below, illustrative precursor powders are made following the procedure described above. These powders are characterized particularly by containing a major amount of silicon and a minor amount of alumina, and either a major or minor amount of sialon depending upon the nitridation temperature selected. Other mineralogical phases are present, as may be seen by reference to following Table II.

TABLE II

| Example Number | Sialon ($\beta'$-Si$_3$N$_{4s.s.}$) | Si | $\alpha$-Al$_2$O$_3$ | $\alpha$-Si$_3$N$_4$ | $\beta$-Si$_3$N$_4$ | AlN | "X" | Si$_2$ON$_2$ |
|---|---|---|---|---|---|---|---|---|
| | | | Mineralogical Phases | | | | | |
| I | m | M | m | tr. | tr. | m | n.d. | n.d. |
| II | M | M | m | tr. | m | tr. | n.d. | n.d. |
| III | M | M | m | tr. | m | n.d. | n.d. | n.d. |
| IV | m | M | m | tr. | tr. | m | n.d. | n.d. |
| V | M | M | m | tr. | m | m | tr. | n.d. |
| VI | M | M | m | tr. | m | m | tr. | tr. |

Estimated mineral composition:
M = major;
m = minor;
tr. = trace;
n.d. = not detected The metastable precursor powder produced by the above-described process is used in producing sialon by the process to be described below.

In the first essential step of this process for producing sialon, the precursor powder is doped with an additive for promoting sintering. A suitable dopant additive is the oxide of yttrium or an element of the Lanthanide series, with a very suitable additive being Y$_2$O$_3$ or Gd$_2$O$_3$. The additive is used in an amount sufficient to exert the sintering promoting effect. Advantageously, such an amount is about 5 weight percent. After the dopant additive is combined with the precursor powder, the resulting mixture is milled and screened through 50 mesh.

As the next essential step in this process, the doped precursor powder is cold pressed. A suitable pressure for cold pressing is in the range of about 15,000 to 25,000 Psi at ambient temperature. A particularly suitable pressure is about 20,000 Psi. This step is to be contrasted with use of a hot pressing technique prior to sintering. Exemplary of prior art using a hot pressing technique is Jack et al., which is discussed above as background art and which discloses use of such a technique in the paragraph bridging columns 4 and 5 thereof. The doped precursor powder may be slip cast rather than cold pressed as described above. In carrying out the slip casting step, a slurry of about 50–70% solids in water is advantageous. Use of about 60% solids is particularly advantageous in forming the slurry.

As the final essential step in this process, the cold pressed or slip cast doped powder is subjected to a controlled sintering step under a nitrogen atmosphere. In performing this step, there is selected a temperature and a time sufficient to produce a substantially single phase of sialon, and the nitrogen atmosphere is maintained at a pressure sufficient to prevent sialon decomposition. A suitable temperature for this step is about 1650°–1750° C. and a suitable time is about 30–90 minutes. A preferred temperatures is about 1700° C., and when this temperature is selected, a preferred time is about one hour. A nitrogen atmosphere in the range of about 3–10 psi is sufficient to prevent sialon decomposition. Preferably, a pressure of about 5 psi is used. Reference is now made to following Table III as defining the language "substantially single phase of sialon". The particular Examples taught in this Table are described in detail further below.

Specific examples of the present invention will now be set forth. Unless otherwise indicated, all percentages are by weight. It is to be understood that these examples are merely illustrative and are in no way to be interpreted as limiting the scope of the invention.

EXAMPLE I

Using equation (1) set forth above, a value of 1.82 is selected for X. Selection of this value results in a composition consisting of 77.4 mole percent silicon, 11.3 mole percent alumina, and 11.3 mole percent aluminum.

The source of each of these starting materials is the exemplary source disclosed earlier. These starting materials are thoroughly dry mixed, the mixes are screened through 50 mesh, the screened powders are agglomerated with water to about minus 20 mesh, and the agglomerated powders are then dried. The dried agglomerated powders are pre-reacted at 500° C. for one hour under a nitrogen atmosphere of 3 psi. The pre-reacted mixture is then reacted with nitrogen at 3 psi at a temperature of 1300° C. for 4 hours to produce a precursor powder. The mineralogical phases present in this precursor powder are set forth in Table II. The weight percent nitridation is set forth in Table I.

EXAMPLE II

Using a nitriding temperature of 1380° C., instead of 1300° C., the procedure of Example I is followed as to all other details, and there is produced a precursor powder which is identified as to weight percent nitridation and as to mineralogical phases in Tables I and II, respectively.

EXAMPLE III

Using a nitriding temperature of 1400° C., instead of 1300° C., the procedure of Example I is followed in all other respects. Data for the precursor powder produced by this procedure is set forth in Tables I and II.

EXAMPLE IV

Using equation (2) set forth above, a value of 1.82 is selected for X. Selection of this value results in a mixture consisting of 77.4 mole percent silicon, 11.3 mole percent alumina, and 11.3 mole percent aluminum nitride. The source of each of these starting materials is the exemplary source disclosed earlier. The starting materials are thoroughly dry mixed, the mixes are screened through 50 mesh, the screened powders are agglomerated with acetone to about minus 20 mesh, and the agglomerated powders are then dried. The dried agglomerated powders are then reacted with nitrogen at 3 psi at a temperature of 1300° C. for 4 hours to produce a precursor powder. Data for this precursor powder is set forth in Tables I and II.

EXAMPLE V

Using a procedure that corresponds in all details to Example IV except that a nitriding temperature of 1380° C. is used, there is produced a precursor powder characterized by the data set forth in Tables I and II.

EXAMPLE VI

Using a procedure that corresponds in all details to Example IV except that a nitriding temperature of 1400° C. is used, there is produced a precursor powder characterized by the data set forth in Tables I and II.

TABLE III

| | Mineralogical phases identified | | | | | |
|---|---|---|---|---|---|---|
| Example Number | Sialon ($\beta'$-Si$_3$N$_{4s.s.}$) | $\beta$-Si$_3$N$_4$ | $\alpha$-Al$_2$O$_3$ | AlN | "X" | Unidentified d-spacings |
| VII | M | tr. | n.d. | n.d. | n.d. | 3.069,2.795,4.86 |
| VIII | M | n.d. | n.d. | n.d. | n.d. | 3.065,2.799 |

Estimated mineral composition:
M = major;
m = minor;
tr. = trace;
n.d. = not detected

EXAMPLE VII

To the precursor powder produced in Example II, there is added 5 weight percent Gd$_2$O$_3$. The doped precursor powder is milled and screened through 50 mesh, and in order to obtain a modulus of rupture (MOR) determination, ¼×1×2-inch briquettes of the powder are cold pressed to 20,000 psi. The pressed powder is sintered at 1700° C. for one hour under a nitrogen atmosphere maintained at 5 psi. The mineralogical phases identified in the sialon produced are set forth in Table III.

This sialon is cut into test specimens having a size of ¼×¼×1¾-inch and these specimens are tested for sintering density and porosity using ASTM test method C20-74. These specimens are tested for modulus of rupture at 25° C. and at 1200° C. using a three point loading system and an Instron testing machine coupled with a molybdenum disilicide furnace. The results are set forth in Table IV.

EXAMPLE VIII

Using a procedure that corresponds in all details to Example VII except that the precursor powder of Example IV is used, there is produced a sialon having the phases set forth in Table III. This sialon is cut into test specimens having a size of ¼×¼×1¾-inch, and then these specimens are tested for density, porosity, and modulus of rupture (MOR) using the tests employed in Example VII. The results are set forth in Table IV.

COMPARATIVE EXAMPLE

For comparison as to properties, a commercial reaction sintered silicon nitride obtained from Kawecki Berylco Industries, Inc. is tested for density, porosity, and MOR using the standard tests employed in Examples VII and VIII.

TABLE IV

| Example Number | Starting Material | Density (gm/cm$^3$) | Porosity (vol-pct) | MOR, psi 25° C. | MOR, psi 1200° C. |
|---|---|---|---|---|---|
| VII | Precursor Powder of Ex. II | 2.8 | 7.5 | 39,900 | 24,500 |
| VIII | Precursor Powder of Ex. IV | 2.8 | 8.1 | 31,200 | 23,800 |
| Comparison | Reaction Sintered Si$_3$N$_4$ | 2.6 | 14.2 | 34,400 | 33,000 |

This material is selected for comparison since no commercial sialons are presently available. From preceding Table IV, it may be seen that the sialons produced by the process of the present invention have a better sintered density than this silicon nitride, and that the MOR thereof is as good as this nitride.

To provide further comparison as to properties, the sialons of Examples VII and VIII are compared with this silicon nitride for oxidation resistance. The test is carried out in an air atmosphere at 1200° C. for 48 hours, and the results are set forth in following Table V. From this Table, it may be seen that the sialons produced by the process of the present invention have better oxidation resistance than this silicon nitride.

TABLE V

| Test Material | Weight Gain (mg/cm$^2$) |
|---|---|
| Sialon of Example VII | 1.2 |
| Sialon of Example VIII | 2.4 |
| Reaction Sintered Si$_3$N$_4$ | 10.5 |

EXAMPLE IX

Using the procedure set forth in Example I, except that a value of 0.28 is selected for X and except that a temperature of 1350° C. is used, a metastable precursor powder is produced. Accordingly, this powder is prepared from starting materials consisting of 97.0 mole percent silicon, 1.5 mole percent alumina, and 1.5 mole percent aluminum. To this precursor powder there is added 5 weight percent Y$_2$O$_3$ as a dopant, and the resulting mixture is milled and screened through 50 mesh. The doped powder is cold pressed to 20,000 psi, and the pressed powder is sintered at 1700° C. for one hour in a nitrogen atmosphere maintained at 5 psi to produce a sialon.

EXAMPLE X

Using the procedure set forth in Example IX, except that a value of 0.57 is selected for X and accordingly the starting materials consist of 93.4 mole percent silicon, 3.3 mole percent alumina, and 3.3 mole percent aluminum, there is produced a sialon.

EXAMPLE XI

Using the procedure set forth in Example IX, except that a value of 1.17 is selected for X and accordingly, the starting materials consist of 86.0 mole percent silicon, 7.0 mole percent alumina, and 7.0 mole percent aluminum, there is produced a sialon.

EXAMPLE XII

Using the procedure set forth in Example IX except that a value of 1.82 is selected for X and accordingly, the starting materials consist of 77.4 mole percent silicon, 11.3 mole percent alumina, and 11.3 mole percent aluminum, there is produced a sialon.

EXAMPLE XIII

Using the procedure set forth in Example IV except that a value of 0.28 is selected for X and except that a nitridation temperature of 1350° C. is used, a metastable precursor powder is produced. Accordingly, this powder is obtained from starting materials consisting of 97.0 mole percent silicon, 1.5 mole percent alumina, and 1.5 mole percent aluminum nitride. To this precursor powder there is added 5 weight percent Y$_2$O$_3$ as a dopant, and the resulting mixture is milled and screened through 50 mesh. The doped powder is cold pressed to 20,000 psi, and the pressed powder is sintered at 1700° C. for one hour in a nitrogen atmosphere maintained at 5 psi to produce a sialon.

EXAMPLE XIV

Using the procedure of Example XIII except that a value of 0.57 is selected for X and accordingly, the starting materials consist of 93.4 mole percent silicon, 3.3 mole percent alumina, and 3.3 mole percent aluminum nitride, there is produced a sialon.

EXAMPLE XV

Using the procedure of Example XIII except that a value of 1.17 is selected for X and accordingly, the starting materials consist of 86.0 mole percent silicon, 7.0 mole percent alumina, and 7.0 mole percent aluminum nitride, there is produced a sialon.

EXAMPLE XVI

Using the procedure of Example XIII except that a value of 1.82 is selected for X and accordingly, the starting materials consist of 77.4 mole percent silicon, 11.3 mole percent alumina, and 11.3 mole percent aluminum nitride, there is produced a sialon.

The eight sialons prepared in Examples IX–XVI are tested for density, porosity, and MOR, using the same standard testing procedures as were employed in testing the sialons of Examples VII and VIII. The results for the sialons of Examples IX–XII are set forth in FIGS. 1A and 1B and the results for the sialons of Examples XIII–XVI are set forth in FIGS. 2A and 2B. These results indicate that an optimum composition for the preparation of a sialon exists using starting materials consisting of 86.0 mole percent silicon, 7.0 mole percent alumina, and 7.0 mole percent aluminum or aluminum nitride. Thus, a process beginning with this optimum composition represents the most preferred embodiment of the present invention.

INDUSTRIAL APPLICABILITY

Sialon is useful in making valve components in coal gasifiers and in the manufacture of gas turbine engine components and metal die cast molds. Sialon having good thermal shock and thermal creep, high strength and good oxidation resistance are candidate materials for high temperature applications.

I claim:
1. A process for producing sialon comprising:
   (a) producing a metastable precursor powder by nitriding a mixture of about 97.0 to 77.4 mole percent of silicon, about 1.5 to 11.3 mole percent of alumina and about 1.5 to 11.3 mole percent of aluminum nitride at a temperature and for a time sufficient to convert about 20 to 60 percent of the silicon to the nitride form,
   (b) doping said precursor powder with an additive present in an amount sufficient to promote sintering,
   (c) cold pressing or slip casting the doped powder, and
   (d) sintering the cold pressed or slip cast powder under a nitrogen atmosphere at a temperature and for a time sufficient to produce a substantially single phase of sialon, said nitrogen atmosphere being at a pressure sufficient to prevent sialon decomposition.
2. The process of claim 1 wherein said temperature for the nitriding step is in the range of about 1300° to 1400° C.
3. The process of claim 1 wherein said time for the nitriding step is about 2 to 6 hours.
4. The process of claim 3 wherein said time is about 4 hours.
5. The process of claim 1 wherein the starting materials comprise about 86.0 mole percent silicon, about 7.0 mole percent alumina, and about 7.0 mole percent aluminum nitride.
6. The process of claim 1 wherein said temperature for the sintering step is about 1650° to 1750° C.
7. The process of claim 1 wherein said time for the sintering step is about 30 to 90 minutes.
8. The process of claim 6 wherein said temperature for the sintering step is about 1700° C.
9. The process of claim 8 wherein said sintering time is about one hour.
10. The process of claim 1 wherein said nitrogen atmosphere is at a pressure of about 5 psi.
11. The process of claim 1 wherein the doping additive is an oxide of yttrium or of an element of the Lanthanide series.
12. The process of claim 11 wherein said additive is selected from the group consisting of $Y_2O_3$ and $Gd_2O_3$.
13. The process of claim 1 wherein said amount of dopant additive is about 5 weight percent.

* * * * *